United States Patent
Camposeo et al.

(10) Patent No.: US 11,957,077 B2
(45) Date of Patent: Apr. 16, 2024

(54) COMBINED MACHINE FOR HARVESTING AND SHELLING ALMONDS FOR SUPER-INTENSIVE ALMOND ORCHARDS

(71) Applicants: UNIVERSITÀ DEGLI STUDI DI BARI, Bari (IT); IMPRESA DI PIETRO ALFONSO, Andria (IT)

(72) Inventors: Salvatore Camposeo, Bari (IT); Simone Pascuzzi, Bari (IT); Gaetano Alessandro Vivaldi, Bari (IT); Alfonso Di Pietro, Bari (IT)

(73) Assignees: UNIVERSITÀ DEGLI STUDI DI BARI, Bari (IT); IMPRESA DI PIETRO ALFONSO, Andria (IT)

( * ) Notice: Subject to any disclaimer, the term of this patent is extended or adjusted under 35 U.S.C. 154(b) by 543 days.

(21) Appl. No.: 17/288,514

(22) PCT Filed: Oct. 23, 2019

(86) PCT No.: PCT/IT2019/000082
§ 371 (c)(1),
(2) Date: Apr. 23, 2021

(87) PCT Pub. No.: WO2020/084647
PCT Pub. Date: Apr. 30, 2020

(65) Prior Publication Data
US 2021/0274713 A1    Sep. 9, 2021

(30) Foreign Application Priority Data
Oct. 24, 2018    (IT) .......................... 102018000009757

(51) Int. Cl.
*A01D 46/26*    (2006.01)
*A23N 5/00*    (2006.01)

(52) U.S. Cl.
CPC .............. *A01D 46/26* (2013.01); *A23N 5/008* (2013.01)

(58) Field of Classification Search
CPC ........ A01D 46/26; A01D 29/00; A01D 51/00; A01D 51/002
See application file for complete search history.

(56) References Cited

U.S. PATENT DOCUMENTS

| 2,870,594 A | 1/1959 | Larsh |
| 3,462,929 A * | 8/1969 | Ingalls ................. A01D 51/002 236/68 B |

(Continued)

FOREIGN PATENT DOCUMENTS

| FR | 88565 E | 2/1967 |
| GB | 1065048 A | 4/1967 |
| WO | 2017/049131 A1 | 3/2017 |

OTHER PUBLICATIONS

European Patent Office, International Preliminary Report on Patentability issued in parent International Patent Application No. PCT/IT2019/000082, dated Apr. 27, 2021, 5 pages.

(Continued)

*Primary Examiner* — Abigail A Risic
(74) *Attorney, Agent, or Firm* — Danton K. Mak; LEECH TISHMAN FUSCALDO & LAMPL, INC.

(57) ABSTRACT

A combined machine for harvesting and shelling almonds is described, comprising a shelling machine combined with a harvesting machine, wherein the shelling machine is connected to the harvesting machine so that the outlet of the almonds harvested by the harvesting machine coincides with the loading area of the shelling machine; such combined machine allows directly performing in a field, and upon harvesting, the shelling of the almonds; the shelling machine is arranged transversally to the advancement direction of the harvesting machine and is connected to the top part of the (Continued)

Figure 1:
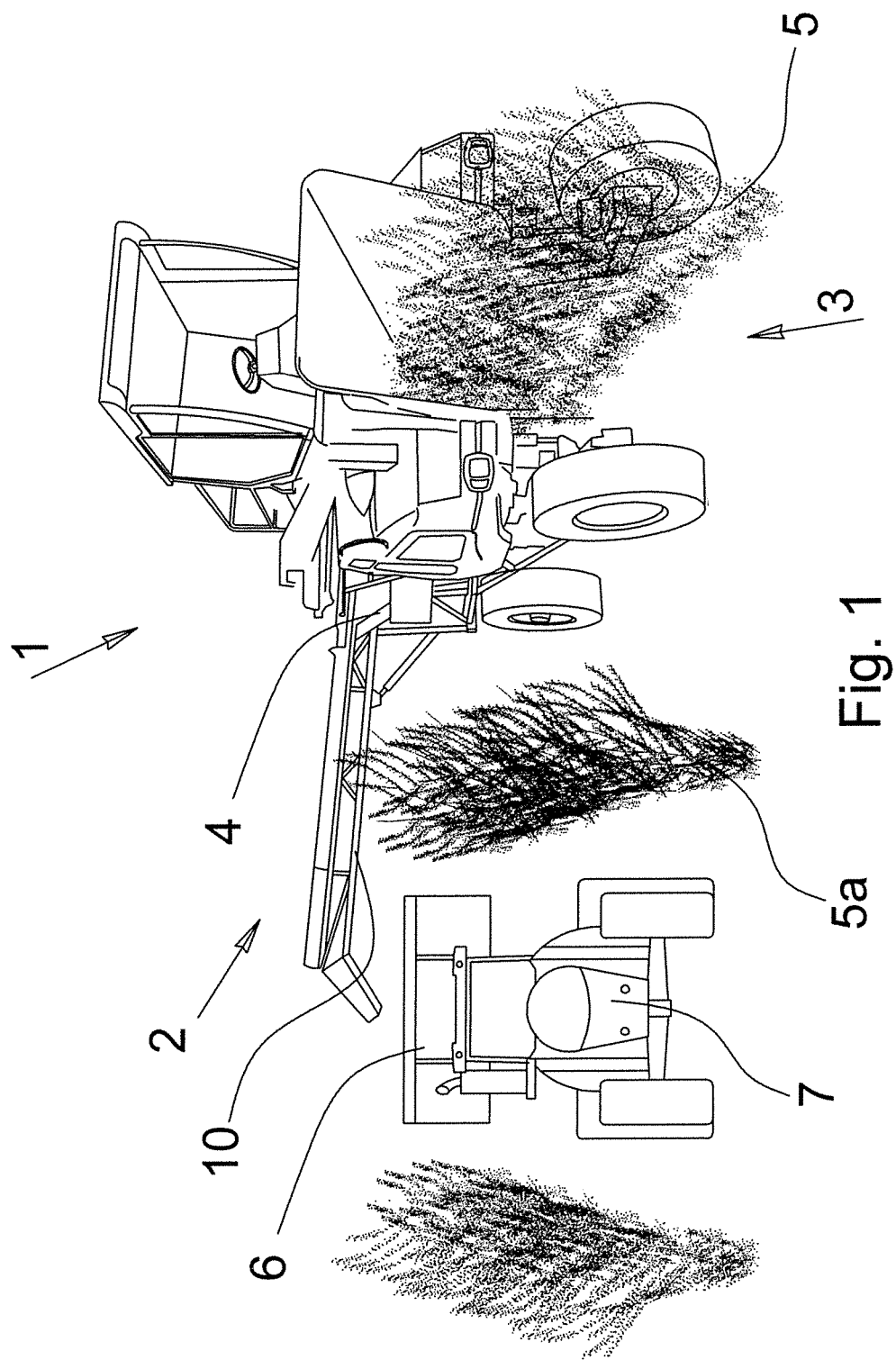

harvesting machine, so that the end from which the shelled products go out bestrides the adjacent row to the row treated by the harvesting machine and the shelled almonds are poured into a trailer towed in an adjacent inter-row.

3 Claims, 2 Drawing Sheets

(56) References Cited

U.S. PATENT DOCUMENTS

| | | | | |
|---|---|---|---|---|
| 5,465,562 | A * | 11/1995 | Croft | A01D 51/002 56/364 |
| 5,592,805 | A * | 1/1997 | Croft | A01D 51/002 56/328.1 |
| 2009/0301320 | A1 * | 12/2009 | Borrell | A23N 5/008 99/569 |

OTHER PUBLICATIONS

European Patent Office, International Search Search Report issued in parent International Patent Application No. PCT/IT2019/000082, dated Apr. 2, 2020, 4 pages.

European Patent Office, Written Opinion of the International Searching Authority issued in parent International Patent Application No. PCT/IT2019/000082, dated Apr. 2, 2020, 4 pages.

* cited by examiner

COMBINED MACHINE FOR HARVESTING AND SHELLING ALMONDS FOR SUPER-INTENSIVE ALMOND ORCHARDS

CROSS-REFERENCE TO RELATED APPLICATIONS

The present Application is a national stage of International Patent Application No. PCT/IT2019/000082, titled "Combined Machine for Harvesting and Shelling Almonds for Super-Intensive Almond Orchards," filed Oct. 23, 2019, which claims priority from Italian Patent Application 102018000009757 filed Oct. 24, 2018, the contents of which are incorporated in this disclosure by reference in their entirety.

BACKGROUND OF THE INVENTION

1) Field of the Invention

The present invention refers to a combined machine for harvesting and shelling almonds, comprising a shelling machine combined with a harvesting machine. Such combined machine allows directly performing in a field, and upon harvesting, the shelling of almonds, obtaining results which are in excess of those of a simple sum of the working of the two composing machines.

The combined machine of the invention has been designed to work "continuously" on super-intensive almond orchards.

2) Background Art

According to the prior art, harvesting machines run astride the rows and perform with continuity a harvesting of almonds from trees in a row. This allows, at the same time, to intercept the products due to a system of conveyor belts arranged in the lower part of the machine. The harvested products are then conveyed towards side containers.

After their harvesting, almonds are subjected to a shelling operation, namely, the removal of the soft part which surrounds the shell, namely, the husk. This type of working is performed with a suitable machine called a shelling machine.

The husk is an external layer of the fruit which protects shell and almond from foreign agents.

Existing shelling machines comprise a hopper in which the almonds to be treated are inserted. The hopper supplies an elongated cylindrical cage equipped with a central shaft with blades which rotates. The centrifugal force due to the rotation joined to the rubbing of the almonds themselves generates the detachment of the husk from the shell, thereby completing a first cleaning of the almonds.

The shaft rotation can be obtained with an electric or endothermic or hydraulic motor supplied by the oil-dynamic plant of a tractor. Alternatively, the shaft rotation can be obtained through a connection with a cardan shaft to the power take-off of a tractor.

A shelling generally includes the presence of at least two operators: a first operator who takes care of constantly filling the hopper with the almonds still to be cleaned and a second operator who removes the husk residuals from the outlet of the shelling machine, in addition to emptying the containers full of cleaned almonds.

The increase of productivity of super-intensive almond orchard plants has made the existing shelling machines inadequate, finding remedies in machines which have remained unchanged in their concept, but substantially with bigger sizes, such as to increase the hourly yield, thereby arriving at models which clean up to 1 ton per hour.

On the other hand, also the collecting system has evolved, with its various mechanical shaking machines, making the conventional shelling machines surpassed and generating repeated machine stops due to shaking operations in order to wait for the shelling operation.

Document GB-A-1065048 discloses a combined agricultural shelling and harvesting machine according to the preamble of claim 1.

SUMMARY OF THE INVENTION

Object of the present invention is solving the above prior art problems, by providing a combined machine, for harvesting and shelling almonds as claimed in claim 1, such combined machine comprising a shelling machine joined to a harvesting machine, wherein the shelling machine is connected to the harvesting machine so that the outlet of the almonds harvested by the harvesting machine coincides with the loading area of the shelling machine.

According to the invention, the shelling machine is arranged transversally to the advancement direction of the harvesting machine and is connected to the top part of the harvesting machine itself. In this way, the end, from which the shelled products go out, bestrides the adjacent row to the row treated by the harvesting machine and the shelled almonds are then poured into a towed trailer in the adjacent inter-row. This operation does not require labor.

Both the harvesting machine, and the shelling machine are known; however, due to the fact that the shelling machine is fastened to the harvesting machine, the assembly of the two machines, in addition to obtaining the effect of performing in a sequence the harvesting and shelling operations, allows avoiding the operation of filling the hopper of the shelling machine.

In other words, the caisson of the harvesting machine behaves as hopper and continuously supplies the shelling machine.

In this way, the two machines work synergistically: in fact, the harvesting machine, which has no role in shelling, increases the yield of the shelling machine since it supplies this latter one with continuity.

On the other hand, this advantage is obtained without any efficiency reduction in the harvesting operations.

The advantages due to the use of a harvesting machine-shelling machine according to the invention essentially consist in that the harvesting and shelling operations are combined, so that no machine stops occur.

Moreover, loading of the shelling machine is automated, so that the first operator responsible for loading the hopper can be done without, and loading times are recovered.

The shelling machine then pours the shelled almonds directly into a body towed by a tractor along the adjacent inter-row, so that the presence of the second operator responsible for emptying the containers full of cleaned almonds is no longer necessary.

Preferred embodiments and non-trivial variations of the present invention are the subject matter of the dependent claims.

It is intended that all appended claims are an integral part of the present description.

It will be immediately obvious that numerous variations and modifications (for example, related to shape, sizes, arrangements and parts with equivalent functionality) can be made to what is described, without departing from the scope of the invention, as appears from the appended claims.

DETAILED DESCRIPTION OF PREFERRED EMBODIMENTS

Figure 2:
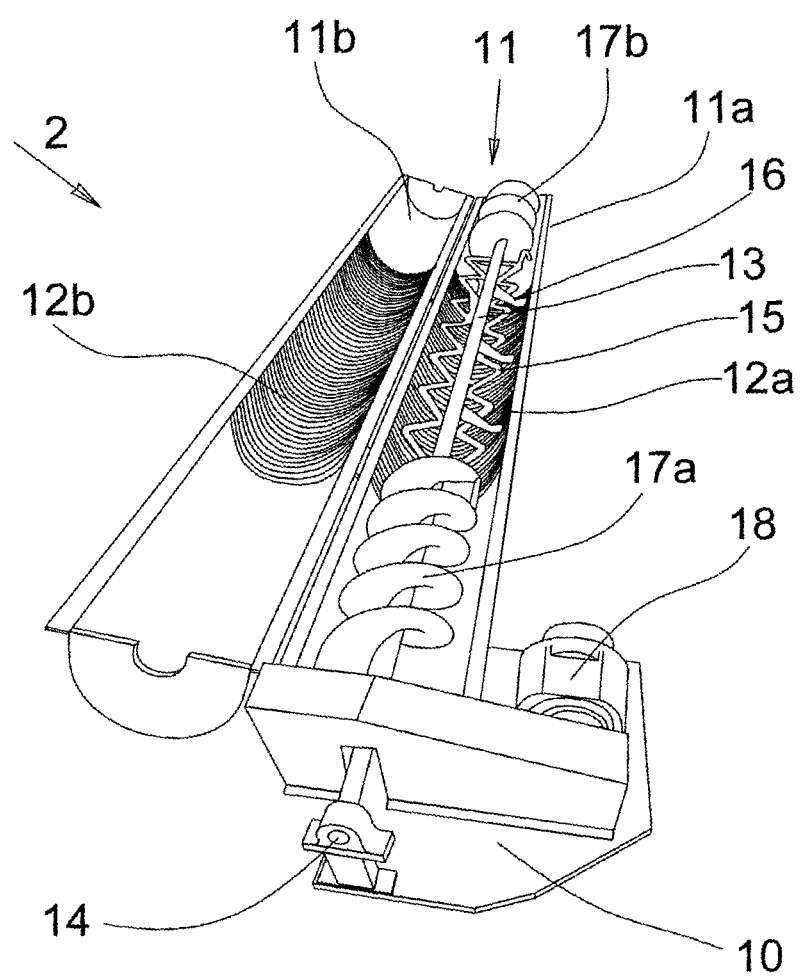

The present invention will be better described by some preferred embodiments thereof, provided as a non-limiting example, with reference to the accompanying drawings, in which:

FIG. 1 shows a combined machine with harvesting and shelling machines according to the present invention working in an almond orchard; and FIG. 2 shows the inside of the shelling machine of FIG. 1.

With reference to FIG. 1, (1) designates a combined machine with harvesting and shelling machine according to the invention. Such combined machine (1) is obtained by assembling a shelling machine (2) on a harvesting machine (3).

The shelling machine (2) is laterally fastened to the harvesting machine (3), next to a body (4), containing the harvested almonds, through suitable junctions and hydraulic jacks, according to the prior art.

In other words, the body (4) of the harvesting machine (3) behaves as a loading hopper of the shelling machine (2).

The assembly of the shelling machine (2) is preferably performed so that the shelling machine (2) is substantially perpendicular to the advancement direction of the harvesting machine (3), and arranged in the upper part of the harvesting machine (3).

In this way, while the harvesting machine (3) harvests the almonds from a row (5), the end of the shelling machine (2) from which the shelled products go out, bestrides the adjacent row (5a) to the row (5) treated by the harvesting machine (3), and the shelled almonds are poured into a body (6) towed by a tractor (7).

The shelling machine (2) comprises a shaped steel frame (10) equipped with suitable pins (not shown) for its connection to the harvesting machine (3).

From the static point of view, therefore, the frame (10) of the shelling machine (2) is connected to the one of the harvesting machine (3) without interruptions, even if regulations are provided in the horizontal and vertical planes through hydraulic jacks.

On the frame (10) of the shelling machine (2) a metallic cage (11) (FIG. 2) is placed, composed of two half-cylinders (11a), (11b) hinged along a generatrix.

The cage (11) can therefore be opened for maintenance and cleaning operations.

The lower half-cylinder (11a) is integral with the frame (10).

The surface of the cage (11) is longitudinally divided into three areas, and the central area is characterized by a succession of transverse slits (12a, 12b) for making the detached hulks go outside.

Inside the cage (11), coaxial thereto, a shaft (13) rotates, which discharges its own weight on the frame (10) through end supports (14) equipped with revolving bearings.

Shaped steel rods (15) and blades (16) are welded onto the shaft (13) next to the central area of the cage (11), namely the one equipped with slits (12a, 12b).

Such rods and blades are used for handling the almonds, thereby taking care of their shelling.

The sections of shaft corresponding to the initial and final areas of the cage (11) are instead equipped with augers (17a, 17b) designed to make the almonds advance.

A motor (18), for example of the hydraulic type, supplied with pressurized oil coming from the harvesting machine (3), rotates the shaft (13) with blades of the shelling machine (2) and its related augers (17a, 17b).

The almonds exiting the harvesting machine (3) are pushed by the auger (17a) of the initial section towards the central area of the shelling cage (11).

The hulks go out of the slits (12a, 12b), while the shelled almonds are automatically sent towards the second auger (17b) and then towards the outlet of the machine (2).

The length of the shelling machine (2) is such that the end goes over the adjacent row (5a) to the row (5) treated by the harvesting machine (3) and therefore pours the end products into the body (6), which transits in the adjacent inter-row, towed by the tractor (7).

Although the present invention has been discussed in considerable detail with reference to certain preferred embodiments, other embodiments are possible. Therefore, the scope of the appended claims should not be limited to the description of preferred embodiments contained in this disclosure. All references cited herein are incorporated by reference in their entirety.

The invention claimed is:

1. A machine for harvesting and shelling almonds, comprising:
    a shelling machine combined with a harvesting machine,
    wherein the shelling machine is connected to the harvesting machine so that an outlet of the almonds harvested by the harvesting machine coincides with a loading area of the shelling machine,
    wherein the shelling machine has a body for collecting the almonds harvested by the harvesting machine, the body coinciding with a loading hopper designed to continuously supply the shelling machine,
    wherein the shelling machine is arranged transversally to the advancement direction of the harvesting machine; and
    wherein the shelling machine is connected to a top part of the harvesting machine so that, while the harvesting machine harvests the almonds from a row, the shelling machine bestrides an adjacent row to the row treated by the harvesting machine in order to discharge the shelled almonds into a body towed in an adjacent inter-row.

2. The combined machine according to claim 1, wherein the combined machine has position regulations of the shelling machine in the horizontal and vertical planes.

3. The combined machine according to claim 2, wherein the position regulations of the shelling machine in the horizontal and vertical planes are obtained through hydraulic jacks.

* * * * *